Nov. 15, 1960 R. D. SALMON ET AL 2,960,164

APPARATUS FOR CHECKING RECORDED INFORMATION

Filed Oct. 25, 1957 4 Sheets-Sheet 1

Inventor
R. D. Salmon -
F. J. L. Turner
By [signature]
Attorney

Nov. 15, 1960 R. D. SALMON ET AL 2,960,164

APPARATUS FOR CHECKING RECORDED INFORMATION

Filed Oct. 25, 1957 4 Sheets-Sheet 2

Inventor
R. D. Salmon - F. J. L. Turner
By [signature]
Attorney

Nov. 15, 1960 R. D. SALMON ET AL 2,960,164

APPARATUS FOR CHECKING RECORDED INFORMATION

Filed Oct. 25, 1957 4 Sheets-Sheet 3

Inventor
R.D. Salmon - F.J.L. Turner
By [signature]
Attorney

APPARATUS FOR CHECKING RECORDED INFORMATION

Filed Oct. 25, 1957 4 Sheets-Sheet 4

Inventor
R.D. Salmon - F. J. L. Turner
By [signature]
Attorney

United States Patent Office 2,960,164

Patented Nov. 15, 1960

2,960,164

APPARATUS FOR CHECKING RECORDED INFORMATION

Reginald Dennis Salmon and Frederick James Leslie Turner, Croydon, England, assignors to Creed & Company Limited, Croydon, England Filed Oct. 25, 1957, Ser. No. 692,397

Claims priority, application Great Britain Nov. 6, 1956

8 Claims. (Cl. 197—1.6)

Figures 1, 2A, 2B, 2C, 2D, 2E, 2F, 2G, 3:
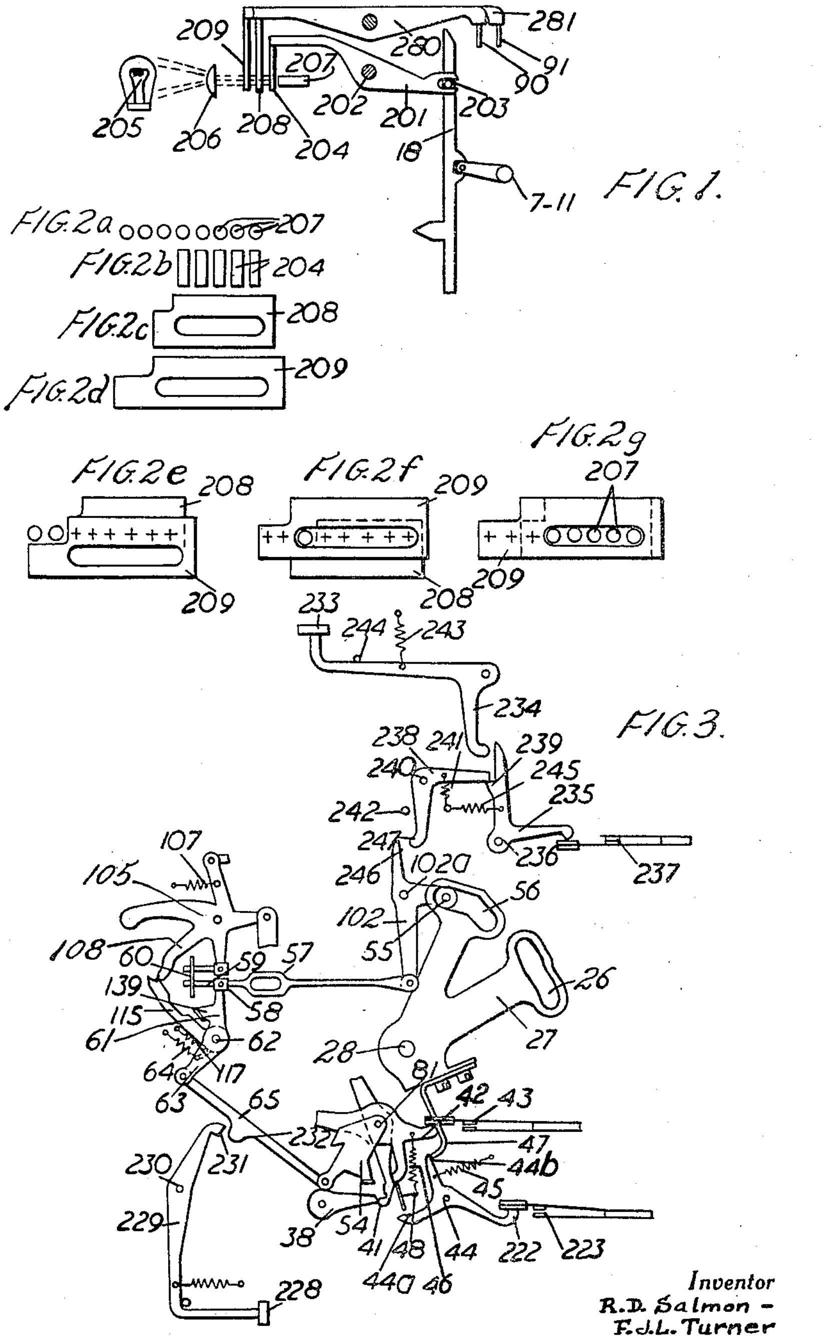

This invention relates to apparatus for checking recorded information, and more particularly for checking information recorded on a perforated tape.

When perforated tape is prepared for programming computing apparatus, it is essential that it shall be free from all errors. Errors may arise from normal operator mistakes or from faulty apparatus, but in either case they must be eliminated before the tape is used to control a computer.

One method by which this may be done involves the use of a tape verifier. In this apparatus a first tape is produced and used to check the production of a second tape. Any disagreement between the first tape and the operation of the keyboard for the production of the second tape locks the keyboard before the disagreeing signal is punched.

The checking operation in the verifier may be carried out either mechanically or electrically. Mechanical checking requires rather involved mechanism which is difficult to build into existing perforators. Electrical checking has been proposed which involves the setting up on a set of contacts of the combination about to be perforated and the comparison of this combination with the combination on a similar set of contacts in a tape reading apparatus associated with the first tape.

While it is possible to operate one contact reliably under control of a key on a keyboard, it is not possible to operate a combination of contacts, such as is used, for example, in a five unit code, reliably from a key unless considerable work is done by the key. The touch of the keyboard is thus adversely affected and becomes very difficult for an operator to use unless a power-driven unit is incorporated in the apparatus. Such a unit is expensive and its inclusion is therefore not desirable. It is therefore an object of the present invention to provide a tape verifier which uses a reliable electrical verification without placing any extra load on the keyboard of the perforating mechanism.

According to one feature of the present invention there is provided apparatus for checking information recorded on a tape comprising a keyboard operated perforator device, a tape sensing device for sensing the elements of a character recorded on said tape, a plurality of comparator circuits, each comprising a means for comparing an element to be perforated with an element recorded in said tape, means for producing a potential in the event of a disagreement in any one of said comparator circuits and means for applying any or all of such potentials to a control circuit to prevent the operation of the perforating device in response to any disagreement in any of said comparator circuits.

Known tape verifiers also suffer from the disadvantage that the operator must work blind, i.e. he has no typewritten copy of what he has produced by the operation of the keyboard. It is accordingly another object of the present invention to provide a tape verifier in which a printed record of the operations made on the keyboard during the perforation of the second tape is obtained.

According to another feature of the present invention there is provided apparatus for checking information recorded on a perforated tape, comprising a typewriter producing a printed record and also controlling a tape perforating device, a tape sensing device for sensing the elements of a character recorded on said tape, a plurality of comparator circuits, one for each element of the code to be perforated, for comparing the elements to be perforated with the corresponding elements as sensed by said tape sensing device, and a control circuit for preventing the operation of the perforating device in response to any disagreement in any of said comparator circuits until manually released.

Figure 4:
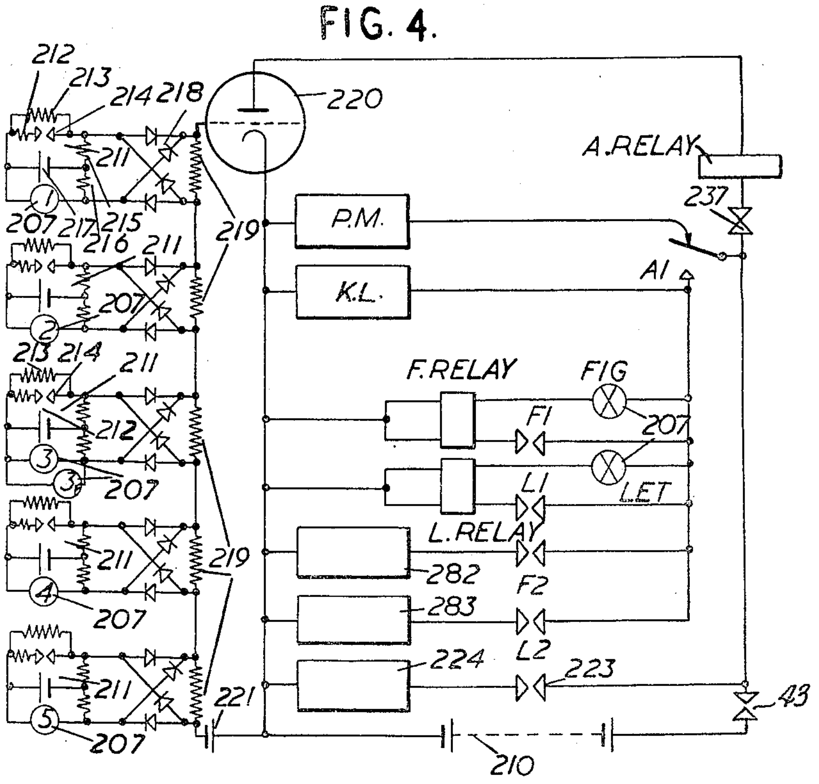
Figures 5, 7A, 7B:
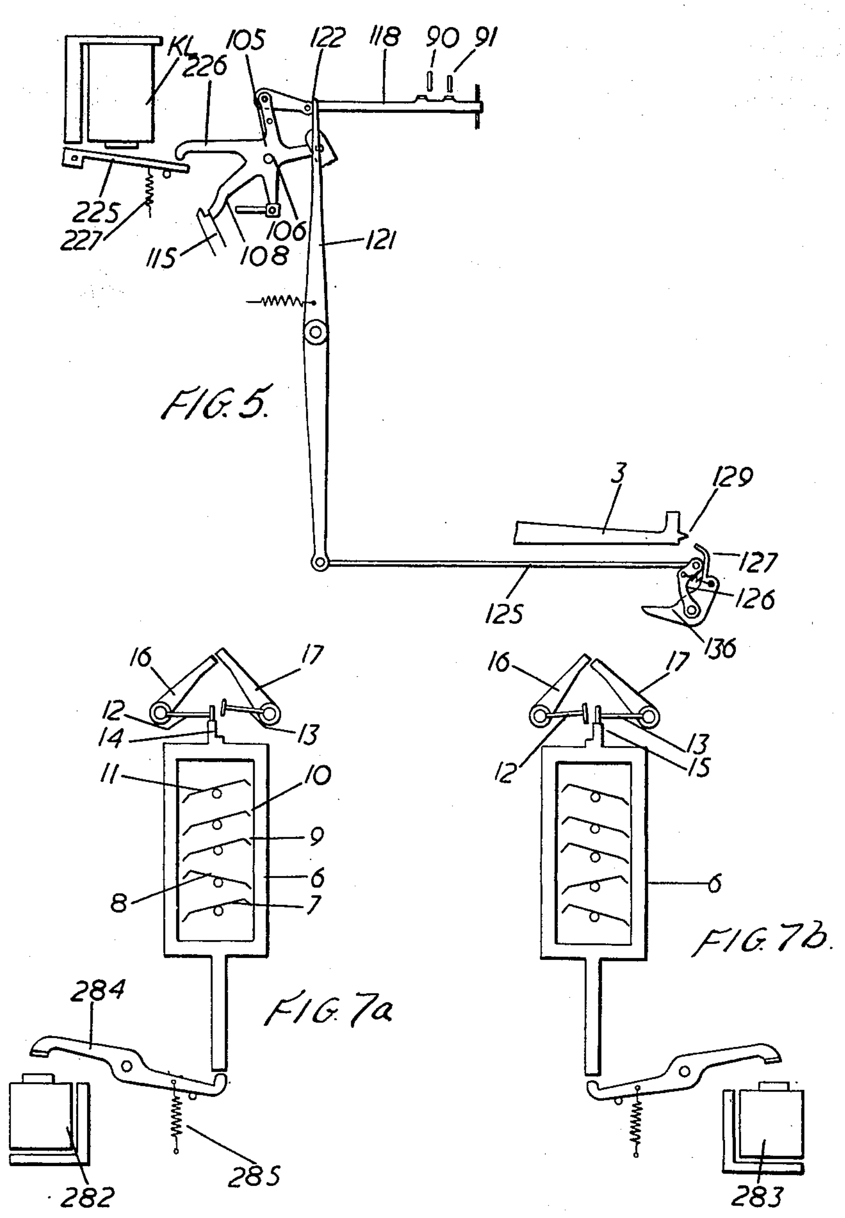
Figure 6A:
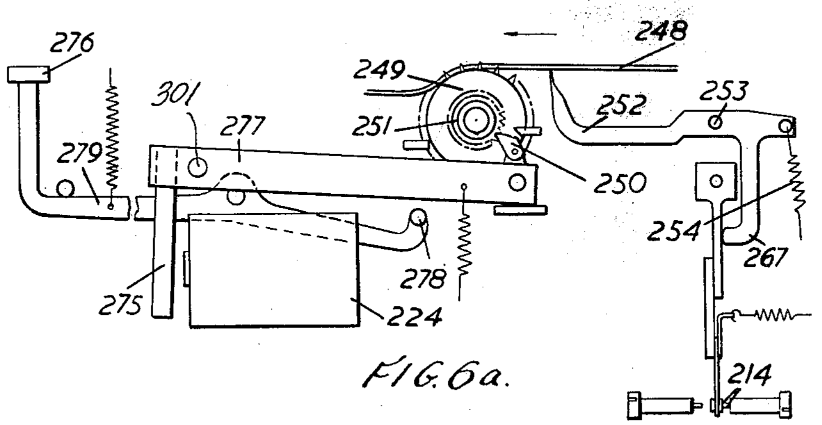

The invention will be better understood from the following detailed description taken in conjunction with the accompanying drawings, in which:

Figs. 1 and 2 show an arrangement according to the present invention for reading the combination about to be perforated in the second tape, Figs. 3 and 5 show an arrangement for locking and unlocking the perforator keyboard, Fig. 4 shows the electrical circuit used in the present embodiment of the invention, Fig. 6 shows the extra mechanism incorporated in a tape sensing device for use in the present invention, and Fig. 7 shows the mechanism employed in one embodiment of the present invention to overcome the difficulties associated with the use of an automatic case shift insertion.

The particular apparatus to which the present invention is shown as applied is the perforating typewriter arrangement described in the patent of R. D. Salmon and F. J. L. Turner, 2,818,116, associated with a tape reader.

Referring first to Fig. 1, the operation of a key on the typewriter causes a combination of code vanes 7—11 in the perforator to be actuated, i.e. to be rotated in one direction or the other about its pivot. Associated with each code vane is a code bar 18 which occupies an upper or lower position depending on the rotation of the corresponding code vane. In Fig. 1 the code bar 18 is shown in the upper position which, in the particular arrangement being described, is that corresponding to a "marking" condition.

A lever 201, pivoted at 202, is provided for each code bar 18 and engages at one end with a projection 203 on the corresponding code bar 18. At the other end lever 201 carries a shutter 204 which can be moved into and out of the path of light from a light source 205 through a lens 206 to a photo-sensitive device 207. It will be observed that, in the upper position of code bar 18, the corresponding shutter 204 prevents light from falling on a corresponding photo-sensitive device 207.

The arrangement of the photo-sensitive devices 207 of the present embodiment of the invention is shown in Fig. 2*a*. The arrangement shown is for use with the well known C.C.I.T. five-unit code the first five photo-sensitive cells from the right serve to detect respective elements of the code, the next one to the left of the code detecting cells detects the insertion of a figure case shift signal, the next succeeding one detects the insertion of a letter case shift signal, and the extreme left cell is used in parallel with the third code cell. The first five cells will hereinafter be termed code cells 1 to 5; the figure case shift cell will be termed FIG. cell; the letter case shift will be termed the LET cell, and the extreme left cell will be termed cell 3F. It will be apparent that this arrangement may be readily adapted for use with a code having any number of elements with or without a case shift by adding or subtracting the necessary photo-sensitive cells.

The shutters 204 associated with the individual code bars 18 are arranged side by side as shown in Fig. 2*b*.

There are also provided shutters 208 and 209 (Fig. 1) which are operated when a case shift signal is inserted, as will be described later. The respective shapes of shutters 208 and 209 are shown in Figs. 2*c* and 2*d* and their normal position relative to the photo-sensitive cells 207 is shown in Fig. 2*g* where light is allowed to pass from source 205 and lens 206 through the apertures in shutters 208 and 209 to the five code element photo-sensitive cells 207. The other three photo-sensitive cells are masked and their position behind the shutters is shown by the crosses in Fig. 2*g*.

Assuming for the moment that the key of the typewriter which has been operated represents a character in the same case of the code as that represented by the key operated immediately precedingly, then shutters 208 and 209 are in their normal positions and a combination of shutters 204 will mask those code element photo-sensitive cells which correspond to elements in the code combination which are in a "marking" condition. The combination which has been set up for perforation by the perforator under control of the typewriter keyboard is thus read in accordance with the energized one or ones of the five code-element photo-sensitive cells 207.

Referring now to Fig. 3, locking latch 41, which in the rest position of the apparatus rests against the end of a trip bar 38, is urged in a clockwise direction about its pivot 81 by spring 46 through arm 48 which is also pivoted at 81. Thus locking latch 41 moves clockwise about 81 when the trip bar 38 is raised. The trip bar 38 is directly linked with the spacing mechanism of the typewriter, so that it is ensured that the combination to be perforated has been set up on code vanes 7—11 and the corresponding code bars 18 before the trip bar 38 is operated. The trip bar 38 is latched in its operated position by locking latch 41.

Also urged in a clockwise direction by spring 46 is another arm 42 integral with arm 48. Arm 42 normally holds the master contacts 43 open, but when the trip bar 38 is raised and arm 42 is able to move in a clockwise direction, the master contacts 43 close.

Referring now to Fig. 4, the closing of the master contacts 43 completes a circuit from power source 210 through the perforator punching magnet PM and contacts A1. The punching electromagnet PM is therefore energised.

The armature of the punching magnet is directly linked to swinging frame 27 (Fig. 3) and causes this frame 27 to swing about its pivot 28. Swinging frame 27 carries two cam tracks 26 and 56. Cam track 26 causes the combination set up on code bars 18 to be read and the punch interponents to be set correspondingly. The mechanism by which this is done forms no part of the present invention and will not be described here. It is fully described in said Patent 2,818,116.

Cam track 56 (Fig. 3) imparts a rotational movement to member 102 through roller 55 at approximately the same time as the punching operation is taking place. Member 102 rotates in a clockwise direction about its pivot 102*a* and thus causes a push rod 57 to move to the left as seen in Fig. 3. Push rod 57 therefore strikes a block 58 on bellcrank 61, turning bellcrank 61 anticlockwise about its pivot 62 against the action of spring 64. Projecting from and fixed to the block 58 is a rod 59 which is allowed to slide in guide rack 60. This mechanism is also described in the above-mentioned patent, but is here described in detail, because it is utilised for an additional purpose in the present invention.

Bellcrank 61 has a second arm 63 which is connected via link 65 to the reset lever 54. Reset lever 54 is pivoted at 81 and moves in an anticlockwise direction about pivot 81 when push rod 57 operates on block 58. Reset lever 54 thus comes into contact with locking latch 41 and forces locking latch 41 and arm 48 in an anticlockwise direction against the action of spring 46. Trip lever 38 is thus disengaged from locking latch 41 and is free to move downwards again under the action of its own spring (not shown) provided that the operator has released the typewriter key.

As arm 48 is moved anticlockwise, its associated arm 42 is brought back to the position shown in Fig. 3, in which the contacts 43 of the electromagnet are again opened and the electromagnet is deenergised and free to begin its return swing.

There is provided a timing latch 44 which is designed to prevent the contacts 43 closing again until the armature of the electromagnet has completed its return swing, even though the trip bar 38 is in an operated position. In the rest position, timing latch 44 is held, as shown in Fig. 3, by an arm 47 attached to swinging frame 27, so that projection 44*a* is out of the path of arm 48. When the contacts 43 are closed and the swinging frame 27 starts to move as the result of the energisation of the electromagnet, arm 47 disengages from arm 44*b* of the timing latch which is then free to move in a clockwise direction about its pivot under the action of spring 45. Arm 48 is not at this time in a position to be engaged by projection 44*a*, so that projection 44*a* rests against arm 48, and only latches with arm 48 when that arm is moved back by the reset lever 54. The engagement of projection 44*a* with arm 48 causes arm 42 to hold the contacts 43 open until swinging frame 27 has returned to its rest position and the engagement of arm 47 with arm 44*b* of the timing latch releases arm 48 from projection 44*a*.

In the present arrangement timing latch 44 carries a third arm 222 which, in the rest position holds the contacts 223 associated with the tape reader feed magnet open. When timing latch 44 makes its first movement to the position in which projection 44*a* is resting against arm 48, the arm 222 allows contacts 223 to move towards one another, but not sufficiently far to close. The contacts 223 only close when timing latch 44 moves into the latching position with projection 44*a* holding arm 48. The contacts 223 open again when swinging frame 27 returns to its rest position and arm 47 engages arm 44*b* of the timing latch as described above.

The closing of contacts 223 completes a circuit (see Fig. 4) from power supply 210 through the tape reader feed magnet 224 which is energised to feed the perforated tape in the tape reader.

The perforation of the combination and feeding of the tape in the tape reader as described above only takes place when there is agreement between the combination set up for performation under control of the typewriter and the combination present in the first tape. To carry out the verification a comparator circuit 211 is provided for each element of the code.

Each comparator circuit 211 consists of a Wheatstone bridge arrangement having in one arm of the bridge a photo-sensitive device 207 and in the opposite arm an arrangement of two resistors 212, 213 and a pair of contacts 214. This is the arrangement proposed for a tape reader in which the result of the sensing is set up on contacts. For a reader which sensed optically the combination sensed could be set up on photosensitive devices similar to 207. In the other pair of opposite arms of the bridge are two equal resistors 215 and 216. A supply of potential for the bridge network is provided at 217, and a network 218 of rectifiers is connected to the two other corners of the bridge.

The photo-sensitive cell 207 is of the type which exhibits a high resistance when no light is falling on it and a lower resistance when it is illuminated. The contacts 214 are the contacts of a tape reader on which the condition of a corresponding element already perforated on the first tape is set up. The contacts are open if the element perforated is a "marking" condition, and closed for a "spacing" condition.

The arrangement of resistors 212, 213 and contacts 214 is such that its resistance with the contacts 214 open is equal to the desistanceof photo-sensitive device 207 when no light is falling on it, and its resistance with the contacts 214 closed is equal to the resistance of photo-sensitive device 207 when light is falling on it. The five comparator circuits are all the same except for a slight modification in the third one where there are two photo-sensitive devices 207 (code cell No. 3 and cell 3F) connected in parallel instead of only one. The arrangement of resistors 212, 213 and contacts 214 is then arranged to have resistances, in the two conditions of the contacts 214, equal to the resistance of the two photo-sensitive devices 207 when both are unilluminated and when one is illuminated and one is not.

When a particular element as set up on a code bar 18 of the perforator is the same as the corresponding element sensed by the tape reader, the Wheatstone bridge network is balanced and no voltage is applied to rectifier network 218. In the event of disagreement between the element to be perforated and the element sensed, an out-of-balance voltage in one direction or the other will appear across resistors 215 and 216 and will be applied to rectifier network 218. The rectifier network 218 consists of four rectifiers so arranged that, whatever the direction of the out-of-balance voltage appearing across resistors 215 and 216, it will appear across resistor 219, which is in the control grid circuit of vacuum tube 220, as a positive voltage on the control grid.

The resistors 219 associated with the respective comparator circuits 211 are connected in series in the control grid circuit of tube 220. A negative bias potential 221 is included in this circuit which normally biases the tube 220 to cut-off. The magnitude of the voltage appearing across a resistor 219 from any comparator circuit 211 which is registering a disagreement is sufficient to cause valve 220 to conduct and the A relay in its anode circuit to be actuated. Thus a single error in any one of the elements of a combination will cause the tube 220 to conduct and to actuate the A relay, provided that the master contacts 43 are closed.

When the A relay is actuated its contact A1 changes over from the upper position in Fig. 4 to the lower position. The circuit from the power source 210 through the punching magnet PM is therefore broken and a circuit is completed through the perforator keyboard locking magnet KL. The tube 220 conducts and the A relay consequently operates immediately that the master contacts 43 are closed, whereas the perforator punch magnet PM requires time to operate. Thus, although both operations are dependent on the closure of the master contacts 43, the punch magnet will not have time to operate before contact A1 changes to its lower position in the event of any disagreement between the combinations being verified. The operation of the tape reader feed magnet is dependent on the energisation of the punch magnet PM, so this also is not operated in the event of disagreement.

The perforating typewriter as described in Patent 2,818,116 has its keyboard locked only when a character in the "figures" case is perforated immediately after a character in the "letters" case or vice versa, i.e. when a case shift signal has to be perforated in addition to the normal character combination. The case shift signal is inserted automatically as is described in that application, and problems in the present invention arising from this fact will be discussed later. The mechanism by which the keyboard is locked during the insertion of a case shift signal is shown in Fig. 5. Member 118 is moved to the right during the insertion of the case shift signal. Projection 122 on member 118 then causes lever 121 to move clockwise about its pivot and this, through link 125, draws bellcrank 126 to the left and with it locking bar 127. Locking bar 127 is thus drawn under projection 129 on the unoperated perforator keybars 3, and over the projection 129 on the particular perforator keybar 3 which has been operated. The typewriter keybars act directly on the perforator keybars 3 and therefore all the keybars of the typewriter except the last one to be operated will be locked when member 118 is moved to the right.

In the embodiment of the present invention herein described, the perforator keyboard is locked by moving member 118 to the right (as seen in Fig. 5) under control of the keyboard locking magnet KL. When magnet KL is energised, its armature 225 moves up and engages arm 226 of bellcrank 105 and turns it clockwise about its pivot 106 thereby moving member 118 and locking the perforator keyboard as described.

As bellcrank 105 is moved under the action of the keyboard locking magnet KL, its arm 108, which is in engagement with a lever 115 spring-urged about its pivot 62 by spring 117, moves up lever 115 and latches in the notched portion of lever 115.

The operation of the keyboard locking magnet may be used to light a warning lamp to tell the operator that there has been a disagreement between his work and the signals on the tape in the tape reading apparatus, or alternatively he may be left to discover the disagreement by trying to operate another key and finding the perforator keyboard locked. If he tries to operate the same key of the typewriter on which the disagreement occurred, he will be able to, but the only effect of the operation will be to print the same character again on the printed record.

On learning of a disagreement, the operator will check the last character printed (or, if the same character appears twice running at the end of the printed record, the last two characters) against the original document. It may be that the operator has struck the wrong key on the typewriter, in which case it is only necessary to erase the incorrect character from the printed record in the usual manner, unlock the keyboard, and strike the correct key.

The keyboard is unlocked by operating the keyboard unlock key 228. This moves the associated lever 229 about its pivot 230, so that the projection 231 thereon engages with a corresponding projection 232 on link 65. Link 65 is therefore moved to the right (as seen in Fig. 3) and contacts 43 are consequently opened, as previously described. This causes the A relay to drop off so that its contact A1 returns to the upper position in Fig. 4, and the keyboard locking magnet KL to be de-energised so that its armature 225 drops off under the action of spring 227.

The movement of link 65 under the action of the keyboard unlock key 228 also causes arm 63 to move in an anticlockwise direction (see Fig. 3) about its pivot 62. The projection 139 on bellcrank 61, which is integral with arm 63, strikes lever 115 and forces it anticlockwise about its pivot 62. Arm 108 is thus disengaged from the notched portion of lever 115 and bellcrank 105 is free to move anticlockwise back to its rest position. The whole apparatus is then free and ready to operate again on the depression of another key.

If the printed record and the original document are in agreement, then the operator has struck the correct key and the error is in the first tape which is being read in the tape reader. The error in this tape may be due to one of three causes:

(1) An additional combination may have been perforated in the tape as well as the correct ones.

(2) The combination corresponding to the one set up on the perforator when the disagreeing key was struck may have been omitted from the tape.

(3) An incorrect combination may have been perforated in the tape in place of the correct one, but with the correct sequence following it.

The operator has therefore to examine the tape in the tape reader and determine which of the three possibilities is in fact the one to which the error is due.

Taking the third possibility first, the operator wants to re-operate the correct key to have the combination perforated in the second tape by the perforator, and to have the incorrect combination fed forward in the tape reader. To set the apparatus to do this he presses the keyboard unlock key 228, which unlocks the keyboard as already described, and also presses the inhibitor key 233 (Fig. 3). The operation of inhibitor key 233 causes associated arm 234 to impinge on one arm of a bellcrank 235 which moves about its pivot 236 to open inhibiting contacts 237.

As bellcrank 235 moves about its pivot 236, it causes one arm of a bellcrank 238 to disengage from latch 239 on bellcrank 235. Bellcrank 238 is thus free to move about its pivot 240 under the action of spring 241 until its other arm makes contact with stop 242. In this position the first arm of bellcrank 238 will meet the outside of latch 239 on bellcrank 235 and thus hold contacts 237 open even when key 233 is released and turned to its rest position against stop 244 by spring 243.

When the correct key is again depressed, the combination is set up in the perforator and the master contacts 43 are closed. There will again be disagreement in one or more of the comparator circuits 211 but, as inhibitor contacts 237 are open, there will be no circuit completed through tube 220 and the A relay, and the punching magnet PM and the tape reader feed magnet 224 will both operate in the normal manner.

As punching magnet PM operates it causes frame 27 to swing, with the result that cam track 56 moves lever 102 clockwise about its pivot **102*a* during the forward swing of the magnet armature. During this movement, the extension 246 on lever 102 strikes projection 247 on bellcrank 238 to move this bellcrank anticlockwise about its pivot 240 against the action of spring 241 so that the first arm of bellcrank 238 is free of latch 239. Bellcrank 235 is then free to move under the action of its spring 245 so that inhibiting contacts 237 close and bellcrank 238 is again latched by the portion 239. The operation of the inhibitor key therefore keeps the inhibiting contacts 237** closed during one comparison period only, the contacts only closing when the punch magnet PM is safely operated. The operation of the tape reader feed magnet follows automatically from the operation of punch magnet PM, as already described.

Figure 6B:
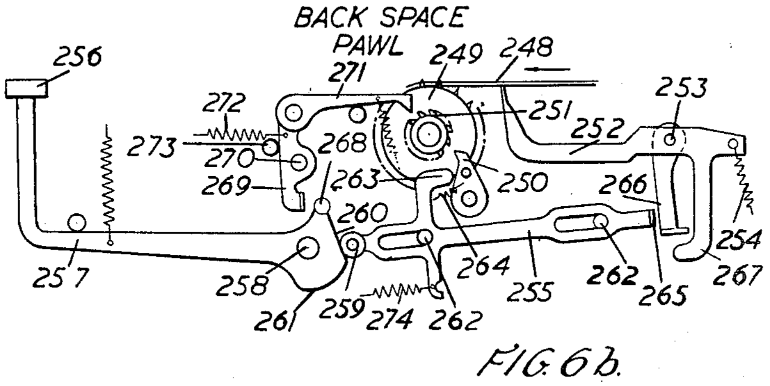

If a character is missing from the first tape, then this tape has first of all to be back-spaced. The mechanism by which this is done is shown in Fig. 6*b*. The first tape 248, i.e. the tape in the tape reader, is normally fed in the direction of the arrow, by a sprocket wheel 249 operated by a feed pawl 250 and a ratchet 251. The individual fingers 252 which sense the tape 248 are pivoted at 253 and maintained in sensing contact with the tape 248 by springs 254. When there is a perforation in the tape the finger 252 will pass partially through the tape, and will be pushed out of the perforation by the tape 248 itself as this is fed forwards, because the finger 252 is inclined slightly in the direction in which the tape is fed.

Because of this inclination of the finger 252, the tape 248 cannot be fed backwards without fear of damage, unless the fingers 252 are disengaged from it. This is done by member 255 under control of back-spacing key 256. The keybar 257 associated with the back-spacing key 256 is pivoted at 258, and a roller 259 on member 255 is in contact with a straight edge 260 on the keybar 257. As the key 256 is depressed so the keybar 257 moves causing roller 259 to run up the straight edge 260 and then run round the curved edge 261. During the movement of roller 259 up the straight edge 260, member 250 is moved on its supports 262 which run in slots in member 255 to the right as seen in Fig. 6*b*. This movement causes arm 263 on member 255 to thrust the feed pawl 250 out of engagement with ratchet wheel 251 against the action of its retaining spring 264. At the same time, projection 265 also on member 255 strikes an arm 266, pivoted at 253 and thrust this into engagement with arm 267 associated with sensing fingers 252, thereby causing the fingers 252 to pivot out of contact with the tape 248.

The curved edge 261 is so arranged that roller 259 runs round this edge and is not moved any further to the right during this movement. It is during this movement of the keybar 257 that projection 268 strikes lever 269 causing it to pivot about point 270 to thrust the back space pawl 271 associated with it against ratchet wheel 251 to move the tape 248 back one position.

When the key 256 is released, spring 272 returns lever 269 to its rest position against stop 273 thereby withdrawing back space pawl 271 from contact with ratchet wheel 251. At the same time spring 274 withdraws member 255 to allow feed pawl 250 to re-engage ratchet wheel 251 and the sensing fingers 252 to resume sensing contact with the tape 248.

Once the tape in the tape reader has been back-spaced, the position is the same as in case 3. The inhibitor key is therefore operated, followed by the correct key, and then perforation of the second tape may be continued normally.

The other cause of error in the tape is the presence of an additional character. In this case all that has to be done is to operate a forward feed key 276 (Fig. 6*a*) to feed the tape 248 in the tape reader forward one position. The normal feed mechanism in the tape reader consists of feed pawl 250, ratchet wheel 251 and sprocket wheel 249, as already indicated. The feed pawl 251 is mounted pivotally on a part 277 of the armature 275 of the tape reader feed magnet 224. Energisation of tape reader feed magnet 224 causes armature 275 to pivot about point 301 and move the feed pawl 250 to operate ratchet wheel 251 to feed the tape 248.

The forward feed key 276 provides a projection 278 integral with the keybar 279 and operation of the key 276 brings this projection into contact with the part 277 of the armature 275 to move the armature 275 and feed the tape 248, even though the feed magnet 224 has not been energised.

The first tape will now be in the correct position for normal operation to continue.

It will be noted that the printed record made is only altered when an incorrect key has been pressed on the keyboard of the typewriter. Therefore, for every error which is found in the first tape, there will be duplication of a character on the printed record. It may thus be determined how many errors occurred in the perforation of the first tape. The probability of there being an error in the verified tape may therefore be assessed, and it may be desirable in some cases to submit the verified tape to further verification to ensure its correctness.

The use of the perforating typewriter which includes the feature of automatically inserting the case shift signals provides some difficulties in the verification. For example, if an incorrect key of the typewriter is operated and this key involves an automatic case shift insertion while the actual key which should have been operated does not involve such an insertion, then when the correct key is subsequently operated there will be another automatic insertion of a case shift signal which will result in another disagreement with consequent waste of time and trouble to the operator.

The number of erroneous operations which may be made involving a case shift signal are quite large, e.g. right character in wrong case, wrong character in right case, wrong character in wrong case, and the error may be in the operation of the typewriter or may be already present in the first tape. It is not practicable to provide a specific remedy to be applied in each of the possible conditions. The solution which has been adopted is, in the event of an automatic case shift signal being set up on the perforating typewriter and an error being detected at the same time, to return the mechanism of the perforating typewriter to the condition it was in before the operation of the wrong key.

In the perforating typewriter of our aforementioned Patent No. 2,818,116, the automatic case shift insertion is dependent upon the operation of two bails 12 and 13 (Fig. 7) which have respective latching projections 16, 17. These bails 12, 13, are operated by respective projections 14 and 15. A projection such as 14 is present on all combination bars 6 corresponding to typewriter letter keys. A projection such as 15 is present on all combination bars 6 corresponding to typewriter figure keys. If a key corresponding to a letter combination is operated projection 14 is raised and member 17 latches member 16 to hold the letter shift bail 12 against the pull of its out-of-balance weight. The latches remain in this position until a key corresponding to a figure combination is operated, when projection 15 is raised and operates on figure shift bail 13 to change over the positions of latches 16 and 17.

There is associated with each bail 12, 13, a latch which can engage the under side of a respective one of the shift insertion bars 90, 91 (Fig. 1). When a key corresponding to a character in a different case from the character to which the precedingly operated key corresponded is operated, then a bail 12 or 13 will be raised and the corresponding shift insertion bar 90 or 91 will also be raised, and will cause the case shift signal to be inserted as described in the aforementioned application.

The raising of a shift insertion bar is used in this embodiment of the present invention to recognise when a key causing a case shift signal to be inserted has been operated. There are associated with shift insertion bars 90, 91 levers 280, 281 carrying respectively shutters 208, 209. The shape of these shutters 208, 209 is shown in Fig. 2. In its normal or upper position shutter 208 allows light to fall on all the photo sensitive devices 207 except the cell LET, while shutter 209 allows light to fall on all devices 207 except code cell 3F and the FIG. cell.

When a shift insertion bar is operated, e.g. bar 90 (Fig. 1) when a letter shift signal is to be inserted, lever 280 is pivoted so that shutter 208 moves down to the position shown in Fig. 2*f*. In this position all the photosensitive devices 207 are blocked except the LET cell. As the letter shift signal is an "all-mark" signal. Cell Nos. 1—5 of devices 207 should all be marked for this signal and so, provided there is a letter shift signal perforated in the first tape, the verification will be correct. The LET cell of the devices 207 is, however, illuminated every time that a key necessitating the insertion of a letters case shift signal is operated on the perforating typewriter.

Similarly shutter 209 is moved to the position shown in Fig. 2*e* every time that a key necessitating the insertion of a figures case shift signal is operated on the typewriter, and in this position light falls on cells 3F and FIG of the devices 207. As the figures case shift signal has a "spacing" condition in the third element, the other elements all being "marking" conditions, and it has been found most convenient to mark Nos. 1—5 of devices 207 together, the extra one 3F has been provided in parallel with the third code cell. Illumination of this enables the verification to be made correctly when a figures case shift signal is present in the first tape and also set up for perforation by the perforating typewriter.

Referring now to Fig. 4, those of the photo sensitive devices 207 termed FIG and LET are connected in arms of the network to which potential from source 210 is only applied when an error has been detected and contact A1 has been moved to its lower position. In the unilluminated condition, cells FIG and LET have sufficient resistance to absorb enough of the potential applied from source 210 to prevent the operation of the relays F and L which are respectively in series with them. When either of the cells FIG or LET is illuminated, then its resistance is decreased sufficiently to allow the corresponding relay, either F or L, to operate and lock up over its contacts F1 or L1.

The F relay or the L relay is therefore operated when a key of the perforating typewriter necessitating the insertion of a case shift signal is operated and an error is found during the verification consequent upon that key operation. When either of these relays operates it also closes another pair of contacts F2 or L2, which causes either a figure shift restoring magnet 282 or a letter shift restoring magnet 283 to be energised.

The way in which magnets 282 and 283 cause the bails 12, 13 and the latches 16, 17 to be restored to the positions they occupied before operation of the last key is shown in Fig. 7. Energisation of figure shift restoring magnet 282 (Fig. 7*a*) causes its armature 284 to close against the action of its spring 285 and raise the combination bar 6. Combination bar 6 is similar to all the combination bars associated with characters in the letters case in that it has a projection 14 on it. However it carries no code projections and so has no influence on the code vanes 7—11. However it has the effect of restoring bails 12, 13 and latches 16, 17 to the positions they were in before the operation of the key in the figures case in the verification of which an error was detected.

Similarly the combination bar 6 of Fig. 7*b* is raised when the letter shift restoring magnet 283 is energised. This combination bar carries a projection 15 and has the effect of restoring bails 12, 13 and latches 16, 17 to the positions they occupied before the operation of the key in the letters case in the verification of which an error was detected.

When examination of the printed record and the tape in the tape reader has revealed to the operator the nature of the error and he operates the keyboard unlocking key, the master contacts 43 (Fig. 4) will open and those of relays F and L and magnets 282 and 283 which were energised will be de-energised. The apparatus is thus returned to its normal position and is ready for further operation.

It is preferable in the tape verifier used in conjunction with a perforating typewriter to disable the carriage return signal so that this is not perforated in the second or verified tape automatically. The carriage is returned by hand and, if it is desired to put carriage return signals in the verified tape, these are inserted by a key at the appropriate points.

While the principles of the invention have been described above in connection with specific embodiments, and particular modifications thereof, it is to be clearly understood that this description is made only by way of example and not as a limitation on the scope of the invention.

What we claim is:

1. Apparatus for checking information recorded on a perforated tape, comprising a typewriter producing a printed record and also controlling a tape perforating device, a tape sensing device for sensing the elements of a character recorded on said tape, a plurality of comparator circuits, one for each element of the code to be perforated, for comparing the elements to be perforated with the corresponding elements as sensed by said tape sensing device, and a control circuit for preventing the operation of the perforating device in response to any disagreement in any of said comparator circuits until manually released, each of said comparator circuits comprising a first device the impedance of which has one of two values dependent on the position of a punch controlling member in said perforator, and a second device the impedance of which has one of two values dependent on the presence or absence of a perforation in said tape, said first and second devices being arranged in two arms of a Wheatstone bridge network in such a manner that the network is balanced when there is agreement between the element to be perforated and the corresponding element on said tape.

2. Apparatus as claimed in claim 1, in which said first device comprises a photosensitive cell and said second device comprises a first resistor in series with a pair of contacts, the combination being shunted by a second resistor.

3. Apparatus as claimed in claim 1, further comprising a plurality of rectifier networks each being connected to a respective Wheatstone bridge network to produce at the output of the rectifier network a corresponding voltage of one given polarity in response to any out of balance voltage in the bridge network.

4. Apparatus as claimed in claim 3, in which said control circuit comprises an electron discharge device normally biased to cut-off a relay in the anode circuit of said electron discharge device, means for applying the output of said rectifier networks to said electron discharge device to cause conduction thereof in the event of disagreement being found in any one of said comparator circuits, and a switch under control of said relay for switching power from the punching electromagnet of said perforating device to an electromagnet operating a locking device for the keyboard controlling said perforating device.

5. Apparatus as claimed in claim 1 for checking information recorded on a perforated tape in a code having more than one case, comprising shift-insertion means operable from one condition to another to cause the perforating device to set up for perforation a signal representing a case shift signal upon the actuation of a key of the typewriter representing a character in a different case from the character represented by the key actuated immediately precedingly, and means operable upon the locking of the typewriter keyboard for causing said shift-insertion means to be returned to the condition occupied thereby before the operation of said first-mentioned key.

6. Apparatus as claimed in claim 5, in which said means for causing the shift-insertion means to be returned to the condition occupied thereby before the operation of said first-mentioned key includes means for recognising whenever said shift-insertion means is operated from either of said conditions to the other.

7. Apparatus as claimed in claim 6, in which said means for recognising the operation of said shift-insertion means comprises a pair of photo-sensitive devices and respective shutters operable to allow light to fall on one of said photo sensitive devices whenever said shift-insertion means is operated.

8. Apparatus as claimed in claim 7, in which said means for causing the shift-insertion means to be returned to the condition occupied thereby before the operation of said first mentioned key further includes a pair of electromagnets associated with respective ones of said pair of photosensitive devices and individually operable in the event of disagreement in any of said comparator circuits and in the event of illumination of the corresponding photosensitive device.

References Cited in the file of this patent

UNITED STATES PATENTS

| | | |
|---|---|---|
| 2,770,304 | Tholstrup | Nov. 13, 1956 |
| 2,818,116 | Salman et al. | Dec. 31, 1957 |
| 2,832,412 | Bellinger et al. | Apr. 29, 1958 |